United States Patent
Carr et al.

[11] Patent Number: 5,799,923
[45] Date of Patent: Sep. 1, 1998

[54] MOTOR MOUNT COMPENSATOR ASSEMBLY

[75] Inventors: Alan I. Carr; Richard W. Wilbur, both of Camden; Samuel H. Tibbetts, II, Rockport, all of Me.

[73] Assignee: The Evolution Co., Inc., Rockland, Me.

[21] Appl. No.: 738,060

[22] Filed: Oct. 25, 1996

Related U.S. Application Data

[60] Provisional application No. 60/007,223 Nov. 3, 1995.
[51] Int. Cl.$^6$ .................................................. F16M 1/00
[52] U.S. Cl. ........................... 248/635; 248/638; 248/674
[58] Field of Search ........................... 248/566, 614, 248/639, 635, 638, 674

[56] References Cited

U.S. PATENT DOCUMENTS

| | | | |
|---|---|---|---|
| 4,161,812 | 7/1979 | Litch, III | 248/638 X |
| 5,110,081 | 5/1992 | Lang, Jr. | 248/635 |
| 5,141,203 | 8/1992 | Baker et al. | 248/635 X |
| 5,303,896 | 4/1994 | Sterka | 248/635 X |

FOREIGN PATENT DOCUMENTS

| | | | |
|---|---|---|---|
| 673052 | 10/1963 | Canada | 248/635 |
| 1186241 | 8/1959 | France | 248/614 |
| 1315608 | 12/1962 | France | 248/674 |
| 320467 | 3/1957 | Switzerland | 248/614 |

*Primary Examiner*—Ramon A. Ramirez
*Assistant Examiner*—Derek J. Berger
*Attorney, Agent, or Firm*—Hamilton, Brook, Smith & Reynolds, P.C.

[57] ABSTRACT

A compensator assembly for incorporating into a motor mount includes a base, a connecting link, a thrust rod, and a pair of rubber thrust grommets. The connecting link and thrust rod form a solid link to connect a motor mount to the flexible rubber grommets held by the base. Bushings positioned coaxially within the grommets prevent lateral deformation of the grommets. The compensator assembly compensates for forces of thrust on the motor mount and prevents the motor mount from exceeding its flex capabilities.

14 Claims, 2 Drawing Sheets

MOTOR MOUNT COMPENSATOR ASSEMBLY

RELATED APPLICATION

This application claims priority to U.S. Provisional Application No. 60/007,223, filed Nov. 3, 1995, the content of which is incorporated herein by reference in its entirety.

BACKGROUND OF THE INVENTION

Industrial motor mounts are used to secure a motor to a floor. Motor mounts require materials that are relatively soft to isolate motor vibrations and are typically comprised of rubber encased in a steel housing. Rubber achieves high strain levels even at very low tensile stress. Rubber also has no yield point (tensile yield limit); instead, the stress increases continuously until there is abrupt failure.

In applications where additional forces of thrust exist on an engine and consequently on the motor mounts, the thrust may be sufficient to cause the rubber to reach failure. For example, in a marine engine installation, propeller thrust is transferred to the engine and motor mounts by means of the solid shaft or stud which connects them.

SUMMARY OF THE INVENTION

The present invention compensates for forces of thrust on a motor mount and prevents the motor mount from exceeding its flex capabilities. Accordingly, a compensator assembly for incorporating into a motor mount includes a metal base, a connecting link, a threaded thrust rod, and a pair of flexible members. The connecting link and thrust rod form a solid link to connect a motor mount to the flexible members held by the base.

The base includes a horizontal section for securing to the base plate of the motor mount and an angular section forming an obtuse angle of preferably 135° relative to the horizontal section. The connecting link includes a bracket section for mounting about a stud of the motor mount and a threaded connector extending from the bracket section. The threaded thrust rod mates at one end to the threaded connector and projects through an opening in the angular base section. The pair of flexible members are mounted about the thrust rod and are secured against opposed surfaces of the angular base section. In a preferred embodiment, the flexible members are rubber grommets.

The compensator assembly of the present invention reduces horizontal forces in thrust applications that would otherwise be detrimental to the motor mount components.

BRIEF DESCRIPTION OF THE DRAWINGS

The above and other features of the invention including various novel details of construction and combinations of parts will now be more particularly described with reference to the accompanying drawings and pointed out in the claims. It will be understood that the particular compensator assembly embodying the invention is shown by way of illustration only and not as a limitation of the invention. The principles and features of this invention may be employed in varied and numerous embodiments without departing from the scope of the invention.

DETAILED DESCRIPTION OF THE PREFERRED EMBODIMENT

Figure 1:
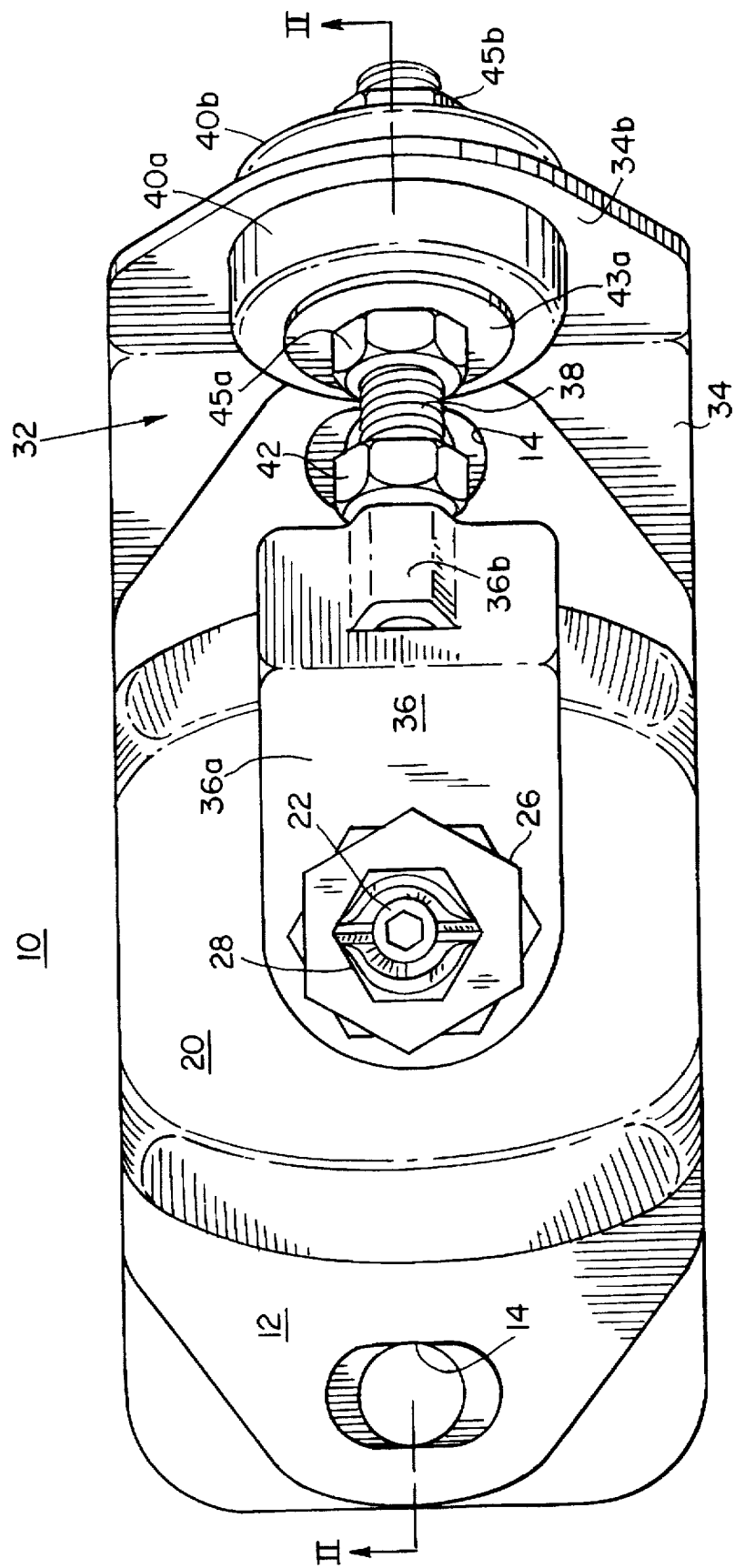
FIG. 1 is a plan view of a preferred embodiment of the compensator assembly of the present invention incorporated into a motor mount.
Figure 2:
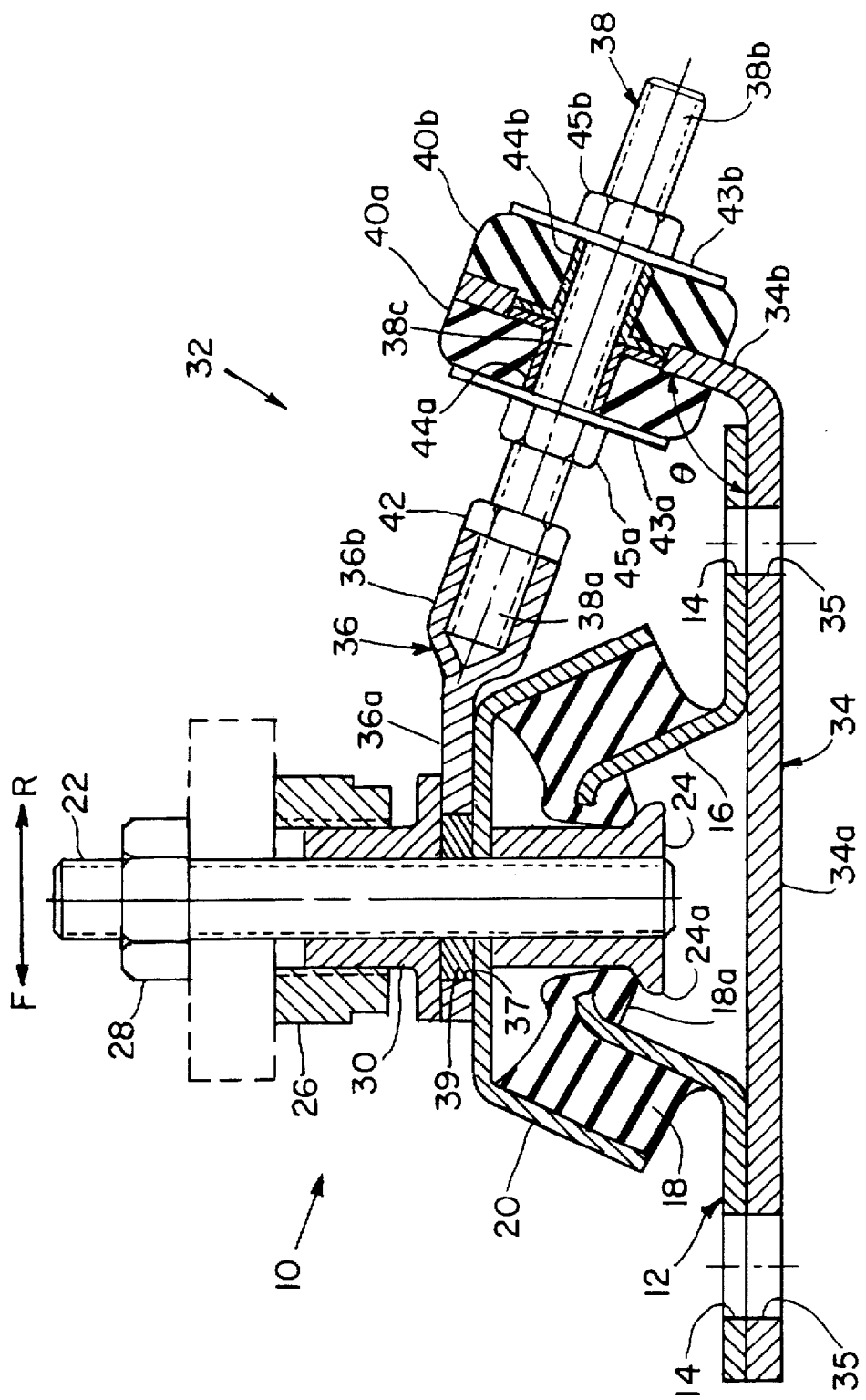
FIG. 2 is a side sectional view of the preferred embodiment of FIG. 1.

FIGS. 1 and 2 show a conventional motor mount 10 incorporating the compensator assembly, generally indicated at 32, of the present invention. The motor mount 10 includes a metal base plate 12 which can be secured to a floor surface through bolt holes 14. A portion of the base plate 12 extends upward to form a footing 16. A rubber isolator block 18 is formed between the footing 16 and a metal shell cover 20.

A threaded motor mount stud 22 projects vertically through an opening in the shell cover 20 and is threaded into an anti-breakaway section 24 projecting below the horizontal surface of the shell cover 20. The anti-breakaway section 24 includes a shoulder 24a which overlaps with a shoulder 18a formed in the rubber isolator block 18 to support the stud 22 under certain shear conditions.

An engine (partially shown in phantom) is mountable on the motor mount stud 22 between leveling hex nut 26 and a lock nut 28. The leveling hex nut 26 is adjustable along a mating base hex nut 30 which is secured against the top surface of the shell cover 20.

The motor mount can be any conventional motor mount, such as a Model 1657 Series Type B manufactured by Metalastik, which model includes a rubber isolator block having a durometer hardness number of 65.

The features of the preferred embodiment of the compensator assembly 32 will now be described. The compensator assembly 32 comprises a metal base platform 34, a metal connecting link 36, a threaded metal thrust rod 38, and a pair of flexible members 40a, 40b. The flexible members 40a, 40b comprise rubber grommets or other suitable flexible material. The connecting link 36 and thrust rod 38 form a solid link to connect the motor mount stud 22 to the flexible rubber grommets 40a, 40b held by the rigid base platform 34.

The rigid base platform 34 includes a horizontal base section 34a having bolt holes 35 which align with the bolt holes 14 when the base platform 34 is positioned under the base plate 12. A section 34b of the base platform 34 is formed at an angle θ for connecting the thrust rod 38 and the rubber grommets 40a, 40b thereto. While the angle θ may be formed in a range from 90° to 150°, the preferred angle is about 135° relative to the horizontal base section 34a. This preferred angle positions the thrust rod 38 in proximity to the base plate 12 of the motor mount 10. This angle value is preferred for achieving optimal leverage and strength in the linkage between the base platform 34 and the motor mount stud 22.

The thrust rod connecting link 36 comprises a horizontal bracket 36a and a threaded connector 36b. The horizontal bracket 36a has a circular opening 37 and a bushing 39 positioned therein for mounting about the motor mount stud 22 between the base hex nut 30 and the shell cover 20. The threaded connector 36b extends from the bracket 36a and receives one end 38a of the threaded thrust rod 38. The thrust rod 38 is further secured in the connector 36b by lock nut 42.

The opposite end 38b of the thrust rod 38 projects through the angular base section 34b. The rubber thrust grommets 40a, 40b are mounted about an intermediate portion 38c of the thrust rod 38 and secured against opposed surfaces of the angular base section 34b by washers 43a, 43b and nuts 45a, 45b. The grommets 40a, 40b have a durometer hardness number of at least 45. In a preferred embodiment, the grommets have a durometer hardness number of about 80. Bushings 44a, 44b positioned coaxially within the grommets 40a, 40b respectively, prevent lateral deformation of the grommets proximate to the thrust rod 38.

A marine engine installation is an example of an application where forces of shear are present. The propeller thrust is transferred through the engine to the motor mounts via the motor mount stud. In the preferred embodiment shown in FIG. 2, such thrust forces arising in primarily forward and reverse directions are indicated by the arrows F and R, respectively. The compensator assembly 32 allows the motor mount 10 to flex without exceeding its horizontal operating limitations. In operation, the compensator assembly 32 described herein supports the motor mount 10 and reduces horizontal forces on the motor mount, and in particular on the rubber isolator block 18, by transferring such forces through the solid link connecting the motor mount stud 22 to the flexible rubber thrust grommets 40a, 40b held by the rigid base platform 34 bolted beneath the motor mount 10.

Equivalents

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A thrust compensator assembly for incorporating into a motor mount having a vertically extending motor mount stud and a bottom, comprising:

a base including a horizontal base section for securing to the bottom of the motor mount and an angular base section having an opening;

a connecting link including a bracket section having an opening for mounting about the motor mount stud and a connector extending from the bracket section;

a thrust rod projecting through the opening of the angular base section and having one end coupled to the connector;

a pair of flexible members mounted about the thrust rod; and securing means for securing the pair of members against opposed surfaces of the angular base section, such that a horizontal force on the motor mount is transferable through the connecting link and thrust rod to the pair of flexible members.

2. The compensator assembly of claim 1 wherein the angular base section forms an angle in a range of about 90° to about 150° relative to the horizontal base section.

3. The compensator assembly of claim 2 wherein the angle is about 135°.

4. The compensator assembly of claim 1 wherein the connector and the thrust rod are threaded.

5. The compensator assembly of claim 1 wherein the flexible members are rubber grommets.

6. The compensator assembly of claim 5 wherein the rubber grommets each include a bushing coaxially disposed therein.

7. A thrust compensator assembly for incorporating into a motor mount having a motor mount stud and a bottom, comprising:

a rigid base including a horizontal base section for securing to the bottom of the motor mount and an angular base section having an opening;

a connecting link including a bracket section having an opening for mounting about the motor mount stud and a threaded connector extending from the bracket section;

a threaded thrust rod projecting through the opening of the angular base section and having one end threaded to the threaded connector;

a pair of rubber grommets mounted about an intermediate portion of the thrust rod; and securing means for securing the pair of grommets against opposed surfaces of the angular base section, such that a horizontal force on the motor mount is transferable through the connecting link and thrust rod to the pair of rubber grommets.

8. The compensator assembly of claim 7 wherein the angular base section forms an angle in a range of about 90° to about 150° relative to the horizontal base section.

9. The compensator assembly of claim 8 wherein the angular base section forms an angle of about 135° relative to the horizontal base section.

10. The compensator assembly of claim 7 wherein the rubber grommets each include a bushing coaxially disposed therein.

11. A method of compensating for forces of thrust on a motor mount having a vertically extending motor mount stud and a bottoms comprising the steps of:

securing a horizontal section of a base to the bottom of the motor mount;

mounting a bracket section of a connecting link about the motor mount stud;

projecting a thrust rod through an opening of an angular section of the base;

coupling one end of the thrust rod to a connector of the connecting link extending from the bracket section;

mounting a pair of flexible members about the thrust rod;

securing the pair of flexible members against opposed surfaces of the angular base sections transferring a horizontal force on the motor mount through the connecting link and thrust rod to the pair of flexible members.

12. The method of claim 11 wherein the step of mounting flexible members comprises mounting rubber grommets about the thrust rod.

13. The method of claim 11 wherein the angular section forms an angle in a range of about 90° to about 150° relative to the horizontal base section.

14. The method of claim 13 wherein the angular section forms an angle of about 135° relative to the horizontal base section.

* * * * *

UNITED STATES PATENT AND TRADEMARK OFFICE
CERTIFICATE OF CORRECTION

PATENT NO. : 5,799,923
DATED : September 1, 1998
INVENTOR(S) : Alan I. Carr, Richard W. Wilbur, and Samuel H. Tibbetts, II It is certified that error appears in the above-indentified patent and that said Letters Patent is hereby corrected as shown below:

Column 4, line 34, delete "bottoms" and insert ---bottom,---; line 46, delete "sections" and insert ---section;---

Signed and Sealed this

First Day of December, 1998

Attest:

BRUCE LEHMAN

*Attesting Officer*   *Commissioner of Patents and Trademarks*